US006442488B2

(12) United States Patent
Xiao et al.

(10) Patent No.: US 6,442,488 B2
(45) Date of Patent: Aug. 27, 2002

(54) INHOMOGENEOUS BACKGROUND BASED FOCUSING METHOD FOR MULTIARRAY INDUCTION MEASUREMENTS IN A DEVIATED WELL

(75) Inventors: Jaiqi Xiao; Ingo M. Geldmacher, both of Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/798,867

(22) Filed: Mar. 1, 2001

Related U.S. Application Data

(63) Continuation-in-part of application No. 09/264,105, filed on Mar. 8, 1999, now Pat. No. 6,219,619.

(51) Int. Cl.$^7$ ................................................. G01V 3/18
(52) U.S. Cl. ........................................................... 702/9
(58) Field of Search ....................... 702/7, 10; 324/338, 324/339

(56) References Cited

U.S. PATENT DOCUMENTS

| | | | |
|---|---|---|---|
| 5,210,691 A | 5/1993 | Freedman et al. | 364/422 |
| 5,329,448 A | 7/1994 | Rosthal | 364/422 |
| 5,339,037 A | 8/1994 | Bonner et al. | 324/366 |
| 5,774,360 A | 6/1998 | Xiao et al. | 702/6 |
| 5,841,281 A | 11/1998 | Beard et al. | 324/339 |
| 5,905,657 A | 5/1999 | Celniker | 364/578 |

OTHER PUBLICATIONS

D. R. Beard et al., A New, Fully Digital, Full–Spectrum Induction Device for Determining Accurate Resistivity with Enhanced Diagnostics and Data Integrity Verification, SPWLA 37th Annual Logging Symposium, Jun. 16–19, 1996, pp. 1–14.

Dave Beard et al., Practical Applications of a New Multichannel and Fully Digital Spectrum Induction System, 1996 SPE Annual Technical Conference and Exhibition, Denver, Colorado, SPE–36504, Oct. 6–9, 1996, pp. 99–109.

T. Barber et al., A Multiarray Induction Tool Optimized for Efficient Wellsite Operation, 1995 SPE Annual Technical Conference and Exhibition, Dallas, Texas, SPE–30583, Oct. 22–25, 1995, pp. 549–561.

T.D. Barber et al., Using a Multiarray Induction Tool To Achieve High–Resolution Logs With Minimum Environmental Effects, 66th Annual Technical Conference and Exhibition of the Society of Petroleum Engineers, Dallas, Texas, SPE–22725, Oct. 6–9, 1991, pp. 637–651.

J. Xiao et al., A Practical Dipping–Effect Correction for Multiarray Induction Tools in Deviated Wells, SPWLA 37th Annual Logging Symposium, Jun. 16–19, 1996, pp. 1–11.

J. Xiao et al., A Petrophysics–Based Resolution–Enhancement Technique for Array–Type Induction Logs, SPWLA 39th Annual Logging Symposium, May 26–29, 1998, pp. 1–14.

Q. Zhou et al., Numerical Focusing of Induction Logging Measurements, 12th workshop in electromagnetic induction in earth, International Union Geodesy and Geophysics, Aug. 8–14, 1994, Brest, France, p. 10.

Primary Examiner—Donald E. McElheny, Jr.
(74) Attorney, Agent, or Firm—Madan, Mossman & Sriram, P.C.

(57) ABSTRACT

In highly deviated wells or when the relative dip angle between formation layering and wellbore axis is large, array induction measurements exhibit erratic spikes, misleading curve separations, and inaccurated resistivity values, preventing log analysts from accurratly evaluating invasion and formation resistivities. Our newly developed deviated-well software focusing (DSF) method that is derived from the Born approximation simultaneously accounts for all these dipping effects. The induction response is separated into two portions: a background response and a perturbation respones. An inhomogeneous, anisotropic background formation model is used to calculate the background response, and the perturbation response is interpreted through a software focusing technique. The combination of the two solutions is the final result.

14 Claims, 7 Drawing Sheets

US 6,442,488 B2

INHOMOGENEOUS BACKGROUND BASED FOCUSING METHOD FOR MULTIARRAY INDUCTION MEASUREMENTS IN A DEVIATED WELL

CROSS REFERENCES TO RELATED APPLICATIONS

This application is a Continuation-in-Part of U.S. patent application Ser. No. 09/264,105 filed on Mar. 8, 1999, now U.S. Pat. No. 6,219,619 the contents of which are fully incorporated herein by reference.

FIELD OF THE INVENTION

The present invention relates to electromagnetic induction well logging. More specifically, the present invention relates to an improved method of focusing the measurements obtained with array induction tools in a deviated borehole.

BACKGROUND OF THE INVENTION

The production of hydrocarbons from subsurface formations typically commences by forming a borehole through the earth to a subsurface reservoir thought to contain hydrocarbons. From the borehole, various physical, chemical, and mechanical properties are "logged" for the purpose of determining the nature and characteristics, including for example, the porosity, permeability, saturation, and depth, of the subsurface formations encountered. One such logging technique commonly used in the industry is referred to as induction logging. Induction logging measures the conductivity or its inverse, the resistivity, of a formation. Formation conductivity is one possible indicator of the presence or absence of a significant accumulation of hydrocarbons because, generally speaking, hydrocarbons are relatively poor conductors of electricity. Formation water, on the other hand, typically salty, is a relatively good conductor of electricity. Thus, induction logging tools can obtain information that, properly interpreted, indicates the presence or absence of hydrocarbons.

These induction (also known as electromagnetic induction) well logging instruments were first introduced by Doll, H. G., "Introduction to Induction Logging and Application to Logging of Wells Drilled with Oil Based Mud," Journal of Petroleum Technology, June, 1949, pp. 148–62. Induction well logging instruments typically include a sonde having one or more transmitter coils and one or more receiver coils at axially spaced apart locations. Induction well logging instruments also typically include a source of alternating current (AC) which is conducted through the transmitter coils. The AC passing through the transmitter coils induces a magnetic field within the surrounding formation, causing the flow of eddy currents within the earth formations. In general, the magnitude of the eddy currents is proportional to the electrical conductivity (the inverse of the electrical resistivity) of the earth formations surrounding the instrument. The eddy currents, in turn, induce a magnetic field that is coupled to the receiver coil, thereby inducing in the receiver coil a voltage signal with magnitude and phase dependent upon the electrical characteristics of the adjacent formation.

Typically, the signal from the receiver coil is applied to one or more phase detection circuits, each of which generates a signal proportional to the magnitude of that component of the receiver coil signal having a particular, predetermined phase. Thus, one such phase detector circuit senses the magnitude of the component of the receiver coil signal that is in-phase with the transmitter current in the transmitter coil. This component signal is commonly referred to as the real or inphase (R) component. A second phase detection circuit commonly used in induction logging tools detects the component of the receiver coil signal that is 90° out of phase with the transmitter current.

This latter component signal is commonly referred to as the quadrature-phase (X) component signal. Because the output signal from the receiver coil is not itself an absolute measure of conductivity, but rather is merely proportional to the true formation conductivity, the output signal must be processed to obtain a log or plot of the true formation conductivity as a function of axial depth in the borehole. Most modern theoretical analysis of induction log processing is based upon the work of H. G. Doll which is summarized in his 1949 article. According to Doll's analysis, the in-phase component of the signal induced in the receiver coil is directly proportional to the conductivity of the surrounding formation, and the constant of proportionality, referred to by Doll as the "geometrical factor," is a function of the geometry of the tool as it relates to the portion of the formation being measured.

Doll calculated what he termed the "unit geometrical factor," which defines the relationship between the conductivity of a so-called "unit ground loop," a horizontal loop of homogeneous formational material having a circular shape with its center on the axis of the borehole and having a very small, square cross section, and the elementary voltage signal contributed by the unit ground loop to the total in-phase signal induced in the receiver coil. By integrating the unit geometrical factor across all unit ground loops lying within a horizontal plane spaced at some axial distance z from the center of the coil system, Doll obtained the geometrical factor for a "unit bed." A plot of this geometrical factor as a function of the axial distance from the center of the coil system gives what is commonly referred to as the "vertical geometrical factor" for the tool. It is an accurate plot of the sonde response function relating formation conductivity to output voltage measurements for the tool, assuming no attenuation or phase shift of the induced magnetic field as a consequence of the conductivity of the surrounding formation.

Induction logging technology has evolved significantly since its introduction by Doll. In recent years, induction devices consisting of several complex coil combinations have been replaced by tools with multiple arrays (see, for example, Beard, D. R., et at., "A New, Fully Digital, Full-spectrum Induction Device for Determining Accurate Resistivity with Enhanced Diagnostics and Data Integrity Verification," SPWLA 37th Annual Logging Symposium, June, 1996, Paper B; Beard, D. R., et at., "Practical Applications of a New Multichannel and Fully Digital Spectrum Induction System," SPE Annual Technical Conference and Exhibition, 1996, Paper No. 36504; and Barber, T. D., et at., "A Multiarray Induction Tool optimized for Efficient Wellsite Operation," SPE 7oth Annual Technical Conference and Exhibition, 1995, Paper No. 30583). Each array consists of one transmitter and a pair of receiver coils. These new induction devices are commonly referred to as array-type induction tools.

A simple induction array (two-coil array and three-coil array) responds to all its surrounding media, including formations, the borehole, and invasion zones if there are any. This response will be degraded by severe borehole effect and will suffer from low vertical and radial resolution. In order to avoid the weaknesses of the simple induction arrays, array combinations are used to increase the response contribution from the medium of interest, such as uninvaded formation, and at the same time to reduce the response contribution from the medium of disinterest, such as the borehole. This process by which the output of an induction logging instrument is made to effectively zoom in on a specific space of its surrounding medium and mute the unwanted peripherals is referred to as focusing.

The older style tools attempt to focus the tool response using carefully selected coil arrangements. The focusing therefore is fixed by the tool design, i.e. these tools are "hardware-focused". In array-type induction tools, the measurements from various arrays are combined through a software algorithm to achieve focusing of the signal response, i.e. these tools are "software-focused". This processing produces a set of curves with predetermined depth of investigation, vertical resolution and other optimized 2-D features.

Using software-based focusing provides greater flexibility for handling various logging environments and for creating more reliable induction logs. However, the quality and accuracy of the final focused logs are dependant on the accuracy of the software focusing method.

Prior art focusing methods are based on a method that was proposed by Barber and Zhou (see Barber, T. D. and Rosthal, R. A., "Using a Multiarray Induction Tool to Achieve High-Resolution Logs with Minimum Environmental Effects," SPE 66th Annual Technical Conference and Exhibition, 1991, Paper No. 22725 and Zhou, Q., Beard, D. and Tabrovsky L., "Numerical Focusing of Induction Logging Measurements," 12th Workshop in Electromagnetic Induction in Earth," August, 1994) and is, for reference purposes, here referred to as the "conventional focusing method". The conventional focusing method can be expressed mathematically as $$\sigma_{TRF}(z) = \sum_{i=1}^{m_{ary}} \sum_{z'=z_{min}}^{z_{max}} W_i(z')\sigma_{ai}(z-z') \quad (1)$$

where $\sigma_{ai}$ is the measured log from the $i^{th}$ array; $W_i$ is the focusing filter; $m_{ary}$ is the total number of arrays; and $z_{min}$ and $z_{max}$ define the depth window surrounding the output point.

Theoretically, the software focusing method described by eq. (1) can be traced back to the Born approximation (a linear approximation of the measured response of a medium) and then the condition for eq. (1) is an assumption of an homogeneous background. This focusing method produces good quality focused logs when the formation conductivity varies with small to moderate contrasts between adjacent formation beds. However, when the formation conductivity varies with very large conductivity contrasts, i.e. if the formation is very "inhomogeneous", the focused logs are not as good as would be expected.

The root cause of this shortcoming is the nonlinearity of the induction response with respect to the formation conductivity. The basic assumption for the focusing algorithm expressed through eq. (1) is that the array measurements behave linearly with conductivity. The error due to the violation of this linearity assumption is referred to as the nonlinearity effect. The nonlinearity effect is formation-dependent: the larger the inhomogeneity, the stronger the nonlinearity effect. A focusing method based on a formation response with a homogeneous background, propagates or even amplifies the nonlinearity effect.

In a given logging environment, the inhomogeneity of a formation is described by numerous factors. Formation layering contributes to the vertical inhomogeneity, which is conventionally described by the $R_t/R_s$ contrast, where $R_t$ is the formation resistivity and $R_s$ is the shoulder resistivity. Radial inhomogeneity is expressed through the $R_t/R_{x0}$ and the $R_{x0}/R_m$ contrast, where $R_{x0}$ is the resistivity of the invaded zone and $R_m$ is the mud resistivity. Other inhomogeneities are introduced through borehole irregularity, tool eccentricity, borehole deviation, etc. Despite the multitude of factors, the vertical inhomogeneity often dominates, particularly when the $R_t/R_s$ contrast is large.

The induction logging response function varies with formation inhomogeneity due to the nonlinearity of the induction measurements. The focusing filters are designed based on Born geometric factors, which equal the response functions under a homogeneous background. With such designed filters and eq. (1), the nonlinearity effect is propagated or even amplified through the focusing process, especially when the formation is inhomogeneous with a large conductivity contrast.

U.S. patent application Ser. No. 09/264,105 (now U.S. Pat. No. 6,219,619) having the same assignee as the present application and the contents of which are fully incorporated herein by reference, teaches use of an an inhomogeneous background formation model. Using this inhomogeneous background formation model, the formation response of the induction tool measurement can be split into two portions: the response due to an inhomogeneous background conductivity, a background response, and a certain "response residue". The background response is the computer simulated measurements of the inhomogeneous background model. The response residue is the difference between raw measurements and the background responses.

The '105 application uses an initial formation model estimated from raw array measurements or processed logs and used as the background conductivity model. For the background response, the focusing result can be directly obtained using focusing target functions instead of applying the conventional focusing processing. Therefore, the focusing result of the background response is ideal and free of any nonlinearity effect. The conventional focusing procedure is applied to the response residue. The final focusing response is obtained by adding the two focusing results. Due to the relatively small amplitude of the response residue, the nonlinearity effect introduced to the focused result is very small. Hence, the nonlinearity effect on the final focusing result is largely reduced. Thus, by introducing an inhomogeneous formation background model into the focusing algorithm, an improved focusing method is achieved having a reduction in the propagation of nonlinearity effects.

The teachings of the '105 application are, however, limited to near vertical wells (wells in which the borehole axis makes a small angle with the normal to the bedding planes). In highly deviated wells when the angle between the normal to the bedding planes and wellbore axis is large, array induction measurements exhibit erratic spikes, misleading curve separations, and inaccurate resistivity values, preventing log analysts from accurately evaluating invasion and formation resistivities. There is a need for a method of determination of formation resistivities in deviated boreholes. Such a method should preferably also account for any anisotropy in the resistivity of the formations. The present invention satisfies this need.

SUMMARY OF THE INVENTION

The present invention is a method and apparatus of using an induction logging tool in a deviated borehole within earth formations for determining an anisotropic conductivity of the formation. An anisotropic background model is estimated from borehole corrected data. An asymptotic conductivity of the anisotropic background model is determined based on the horizontal and vertical conductivities of the model and a known inclination of the tool to the normal to the bedding planes. A modeled response is calculated for this anisotropic background model using a forward modeling program and skin effect corrections are applied to this modeled response. A response residual is calculated as a difference between the skin-effect corrected response and the borehole corrected data. This residual is focused and focused residual is combined with a focused output of the background model. Where appropriate, the intermediate outputs are converted to a true vertical depth to account for the inclination of the borehole axis.

DETAILED DESCRIPTION OF THE PRESENT INVENTION

Figure 1:
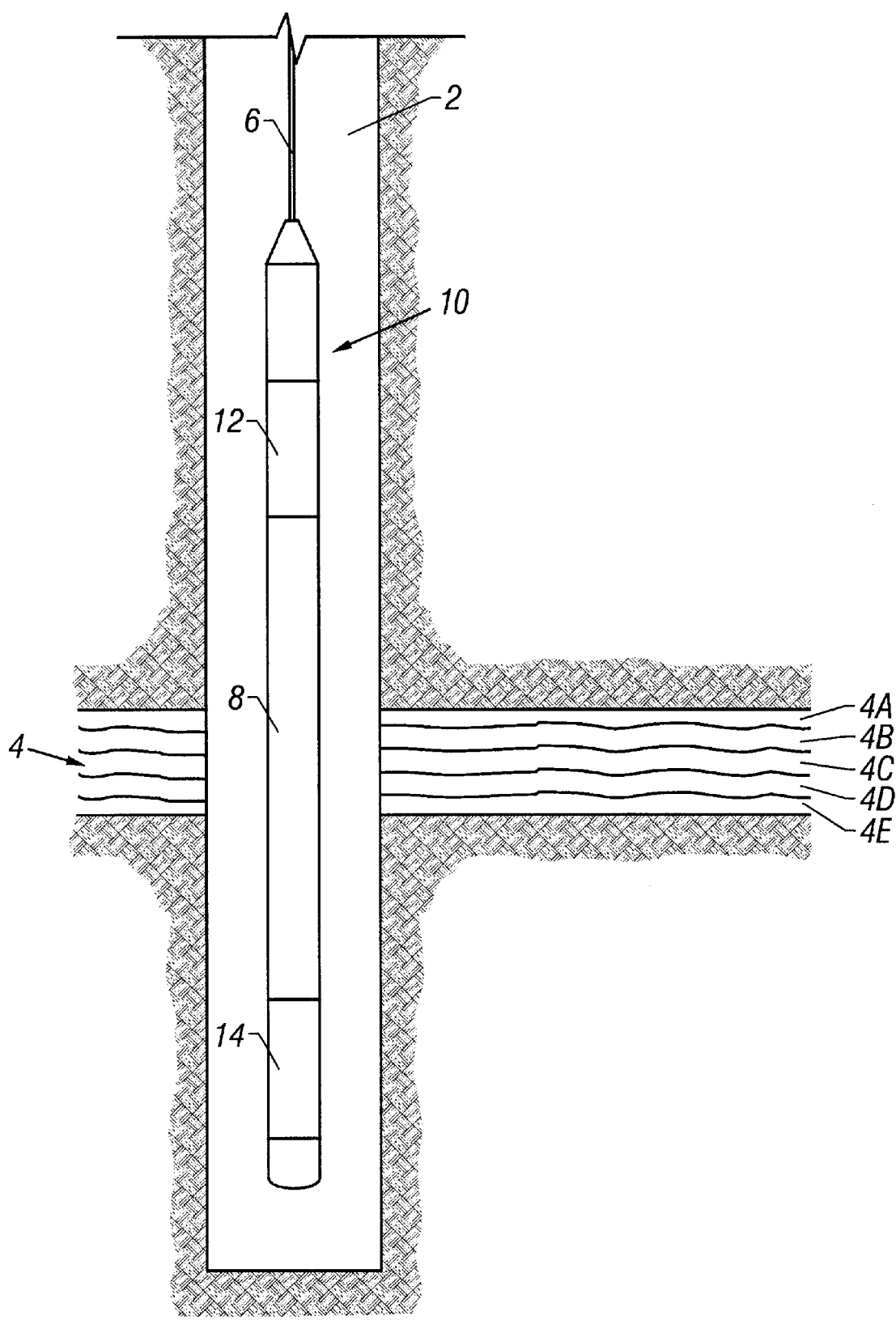
FIG. 1 shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
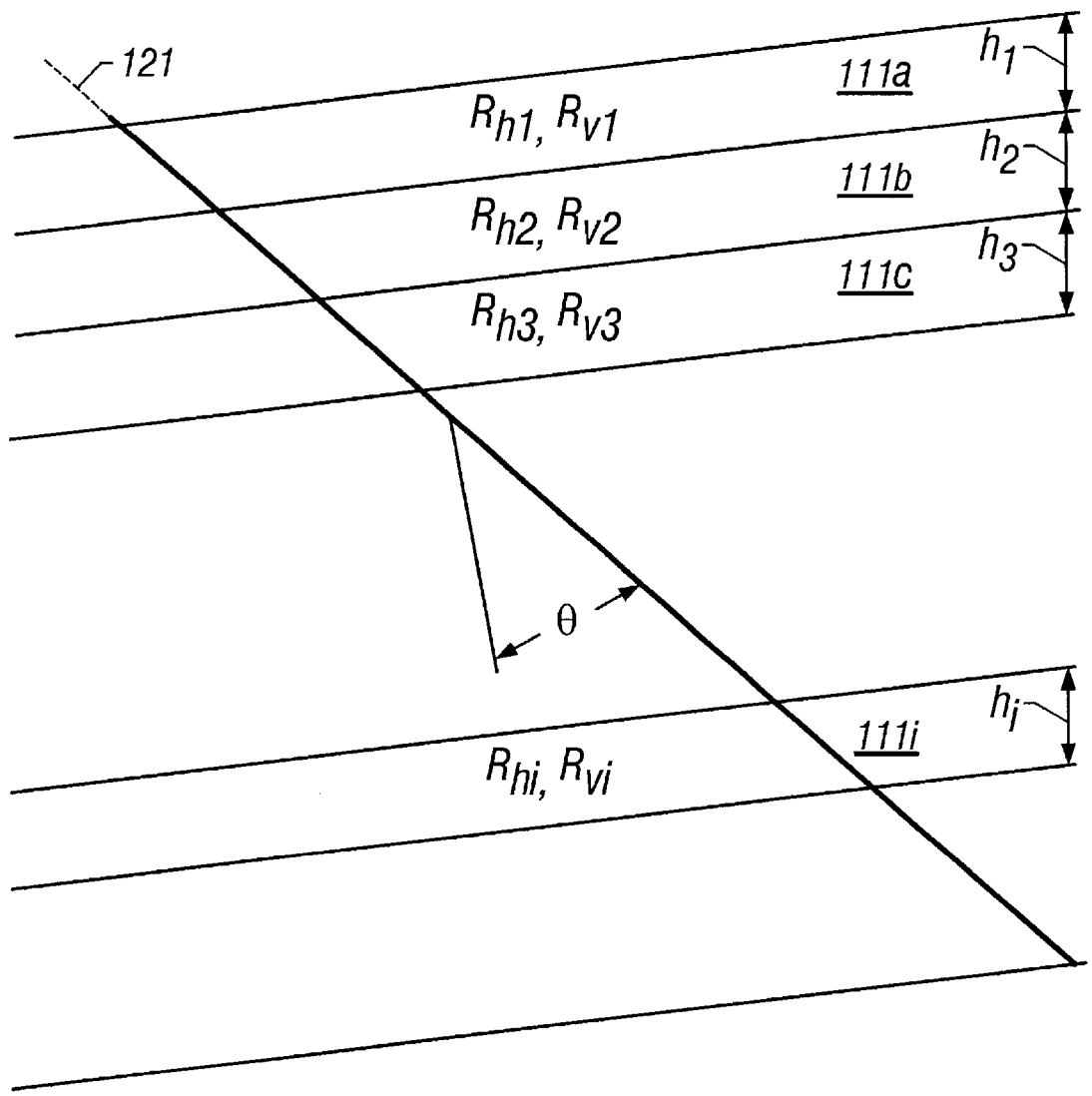
FIG. 2 shows a model used to illustrate the method of the present invention

FIG. 2 shows the model used in the present invention. The model comprises layers $111a$, $111b$, $111c$... $111i$, ... each having thickness $h_i$. The horizontal and vertical resistivities are denoted by $R_{hl}$, $R_{vl}$, ... $R_{hi}$, $R_{vi}$, or equivalently, by horizontal and vertical conductivities $\sigma_{vl}$, $\sigma_{vl}$, ... $\sigma_{hi}$, $\sigma_{vi}$, with the normal to the layer boundaries inclined at an angle $\theta$ to the axis 321 of the borehole that defines the z- axis of the tool. In the method of the present invention, the angle $\theta$ is assumed to be a known quantity. In practice, this may be obtained by making measurements that give the relative dip of the formations. Micro-resistivity logs, dipmeters or other measurements may be used for the purpose. It is commonly observed that the normal to the layer boundaries defines a symmetry axis for the anisotropy of the formations. The horizontal and vertical resistivities (or conductivities) are defined with respect to directions parallel to the layer boundaries and normal to the layer boundaries.

The focusing filter for the conventional focusing method given by eq. (1) is obtained by solving the following problem:

$$g_P(\rho', z) = \sum_{i=1}^{m_{ary}} \sum_{z=z_{\max}}^{z_{\max}} W_i(z') g_B^i(\rho, z-z') \quad (2)$$

with certain constraints. In eq. (2) $g_p$ is a 2-D response function defining ideal 2-D features of the focusing and is often referred to as the "focusing 2-D target function"; $g_B^i$ is the Born 2-D geometric factor of the i-th array. The basic assumption for the focusing algorithm expressed through eq. (1) is the Born-Doll approximation, $$\sigma_a^i(z) = \int_0^\infty d\rho' \int_{-\infty}^\infty dz' \, g_B^i(\rho', z-z') \sigma(\rho', z') \quad (3)$$

where $\sigma_a^i$ is the measurement of the i-th array, and $\sigma(\rho',z')$ is the 2-D formation conductivity distribution.

The inhomogeneous background-based focusing (IBF) method taught in the '105 application stems from the Born Approximation and is mathematically expressed as $$\sigma_a(z) = \int_0^\infty d\rho' \int_{-\infty}^\infty dz' g_B(\rho', z-z')[\sigma(\rho', z') - \sigma_b(\rho', z')] + \quad (4)$$
$$\sigma_{ba}(z)$$

where $\sigma_{ba}$ is the induction response of the background, $\sigma_b$ is the background conductivity. The difference between the true formation conductivity and the background conductivity, $\sigma-\sigma_b$, is referred to as the "conductivity perturbation." By introducing a background, the Born approximation separates the induction response into two portions: the background contribution and the perturbation contribution. If the background conductivity is properly chosen, the Born approximation can better represent the induction measurements than the Doll approximation and the Born-Doll approximation.

The IBF takes the following form:

$$\sigma_p(z) = \sigma_{bp}(z) + \Delta\sigma_p(z) \quad (5)$$

where $\sigma_{bp}$ is the focusing result of the background model, something that is easily calculated from the background model, and $\Delta\sigma_p$ is the focusing result of the perturbation, expressed as:

$$\Delta\sigma_p(z) = \sum_{i=1}^{m_{ary}} \sum_{z=z_{min}}^{z_{max}} W_i(z')[\sigma_a^i(z-z') - \sigma_{ba}^i(z-z')]. \quad (6)$$

Because $\sigma_{bp}$ is directly determined, the focusing filter W only applies to the residue, $[\sigma_a^i(z) - \sigma_{ba}^i(z)]$. Thus, the error propagation of the software focusing is largely reduced and the final focusing results are improved The physics of induction measurements in a deviated well can be mathematically expressed by the following integral equation $$E(r) = E_0(r) + \int dr'' g_0(r, r'')[k^2(r'') - k_b^2]E(r'') + \nabla \int dr'' g_0(r, r'') \left\{ E(r'') \cdot \frac{\nabla[k^2(r'')]}{k^2(r'')} \right\} \quad (7)$$

where E is the electric field; r is the location of the observation point; k is the wave number of the medium; $g_0$ is the Green's function. From this equation two basic dipping effects are derived: the charge effect and the volumetric effect. The charge effect corresponds to the third term of the integral equation. It is caused by the charge build-up while the induced eddy current flows across the formation interfaces. The volumetric effect relates to the second term. When the dip angle is relatively large (>30°), the software focusing of array induction measurements amplifies these dipping effects.

The software focusing of array induction measurements in deviated wells also faces a conceptual dilemma. The major functionality of the software focusing of array induction measurements is to enhance the response contribution of the target area, which is predefined by the required vertical resolution and the depth of investigation. As the depth of investigation increases, the target area moves deeper into the formation in the direction perpendicular to the tool axis, referred to as the "focusing direction." When the borehole is perpendicular to the formation layering, i.e., the relative dip angle equals zero, no other boundaries cross the focusing direction except for the invasion frontiers. In this case any separation of the focused curves indicates the presence of invasion. While in deviated wells, formation interfaces cross the focusing direction. As a result, the separation of the focused curves no longer represents invasion only, making the interpretation of the focused curves impossible.

Besides the charge effect and the volumetric effect, the anisotropy is also an important dipping effect contributor. When the tool is located far away from formation boundaries or the formation is homogeneous, the induction measurement of a two-coil configuration in an anisotropic formation can be expressed as $$\sigma_a \propto \frac{1}{\omega\mu L^2}[(2 - ik_h L)e^{ik_h L} - ik_h L e^{ik_h L \beta}] \quad (8)$$

where $\omega$ is the angular frequency, $\mu$ is the magnetic permeability, L is the spacing between the transmitter and the receiver, and $k_h$ is defined as $$k_h = (1 + i)\sqrt{\frac{\omega\mu\sigma_h}{2}}$$

where $\sigma_h$ is the horizontal conductivity and $\beta$ is defined as $$\beta = \frac{\sqrt{\sin^2\theta + \lambda^2\cos^2\theta}}{\lambda} \quad (8a)$$

and $\lambda$ is defined as the square root of the ratio of the horizontal conductivity to the vertical conductivity.

Eq. (8) leads to the observation that the effect of anisotropy in an induction measurement is a function of the frequency and the transmitter-receiver spacing. Because the skin-effect correction and the standard software focusing assume the formation is isotropic, the anisotropy effect propagates into the final focusing results.

In terms of the amplitude of induction measurements, Moran and Gianzero (1979) derived that a co-axial induction tool reads an asymptotic conductivity $\sigma_e$ given by:

$$\sigma_e = \beta\sigma_h \quad (9)$$

The charge effect, the volumetric effect, and the anisotropy effect all relate to the anisotropic, inhomogeneous background of the formation. Hence, with the Born approximation these dipping effects can be separated from the borehole- and invasion-related perturbation response if the background conductivities $\sigma_{bh}$, $\sigma_{bv}$ are properly determined and the relative dip angle is given.

Figure 3:
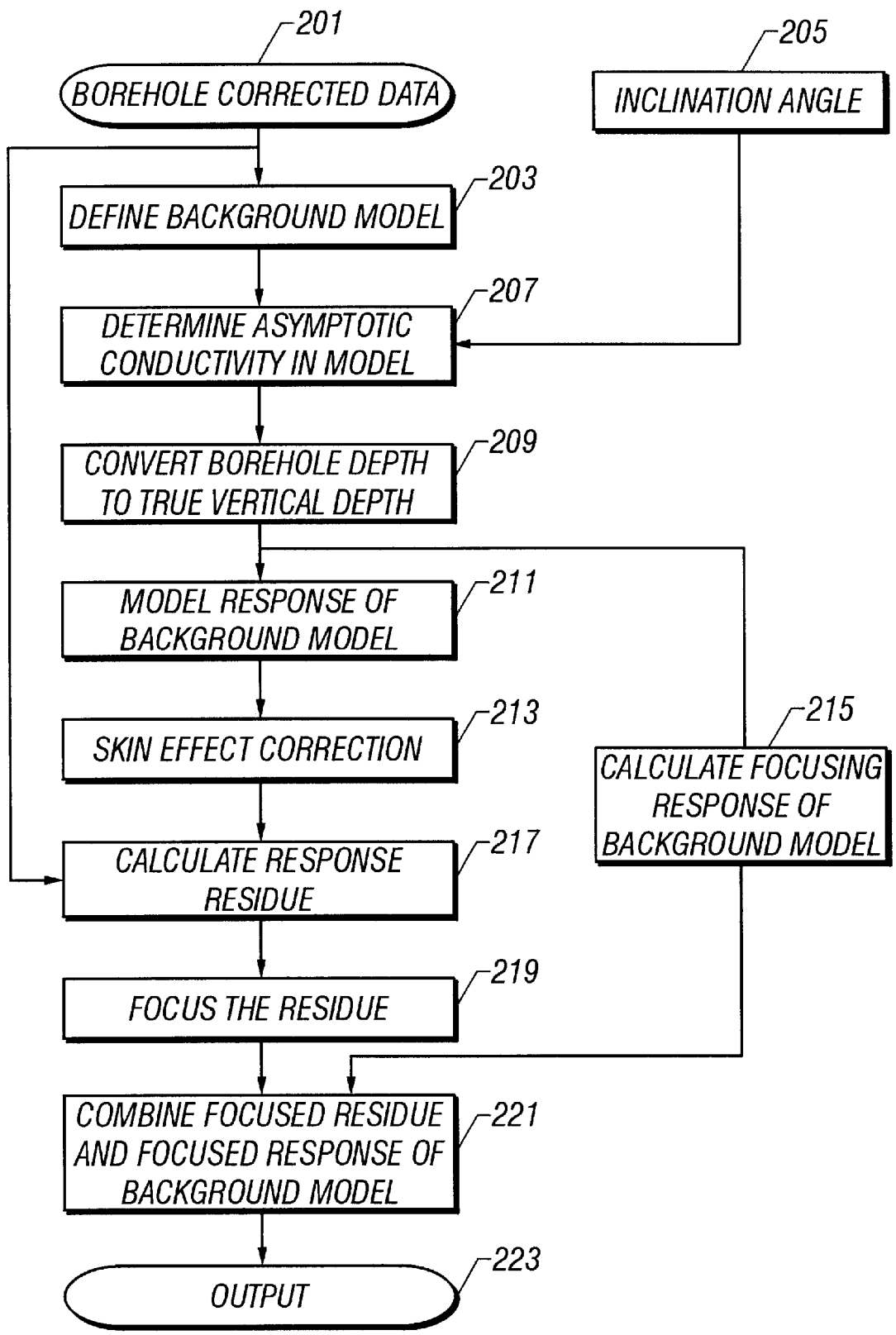
FIG. 3 is a flow chart illustrating steps of the present invention.

Turning now to FIG. 3, a schematic flow chart of the method of the present invention is shown. Starting with the borehole corrected data 201, a background model is formulated 203. As would be recognized by those versed in the art, the better the background model, the better the results will be; however, the choice of the background formation model is not as critical in the method of the present invention as is the choice of an initial model in an iterative nonlinear optimization method.

Using a known inclination angle $\theta$ 205 (this may be obtained by high resolution acoustic or resistivity imaging tools that can determine the orientation of bedding planes relative to the borehole), an asymptotic conductivity model is obtained using eqs. (8a) and (9). With the asymptotic conductivity, the background model may be treated as a deviated isotropic model. This model is then converted to true vertical depth 209 to give a conductivity model as a function of the borehole depth (TVD). This is a straightforward stretching related to the angle $\theta$. A response to the background model is generated 211 and corrected for skin effects 213 using known methods.

The borehole corrected data are compared with the skin-corrected model output and a response residue is determined 217 as a difference between the former and the latter. This residue is focused using eq. (6).

In parallel, the ideal focusing results for the model corrected for true vertical depth are determined 215. When the output of 215 is summed 221 with the output from 219, the end result is the desired focusing result 223.

EXAMPLES

Figure 4A:
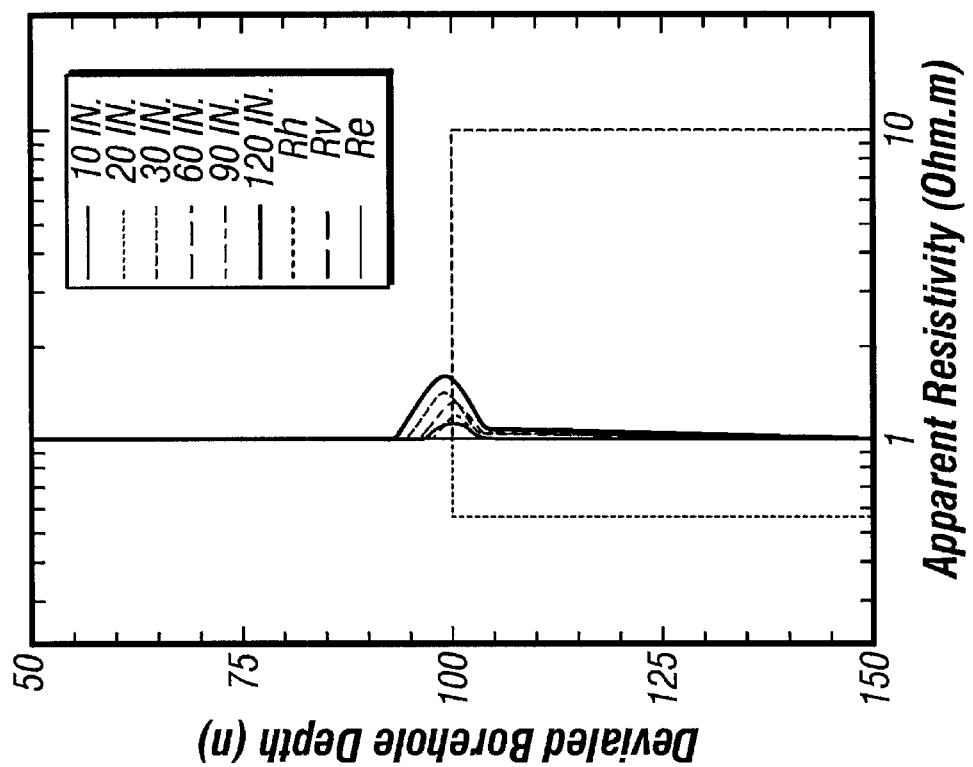
FIGS. 4a and 4b shows the effect of anisotropy and deviation on resistivity measurements.
Figure 4B:
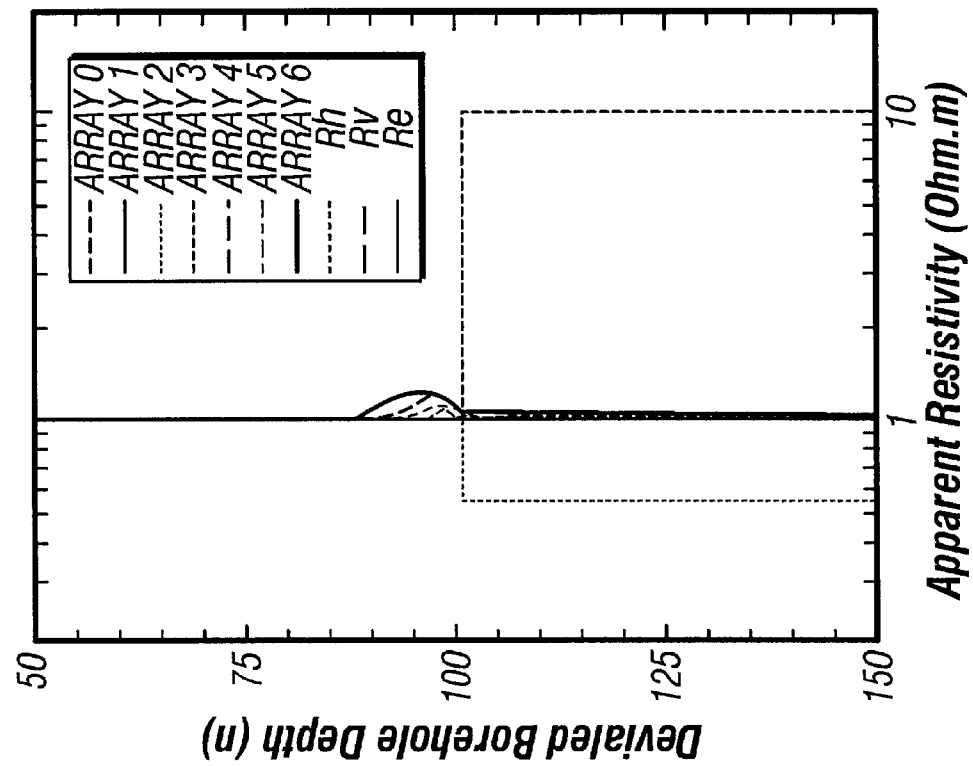

Turning now to FIGS. 4a and 4b, numerical results of forward modeling are shown. The model consists of two semi-infinite formations. The upper one is an isotropic formation of 1 Ohm-m resistivity and the lower one is an anisotropic formation with vertical resistivity of 10 Ohm-m and horizontal resistivity of 0.54 Ohm-m. The relative dip angle is 60 degrees. The resistivities of the lower half space are specifically chosen to have an asymptotic resistivity of 1 Ohm-m. FIG. 4a shows the HDIL skin-effect-corrected curves for seven different source-receiver distances. The 'bump' and the separation of the curves in the vicinity of the formation interface present a pronounced boundary-related dipping effect. Because the anisotropy effect differs with frequency and array spacing, a constant curve separation is seen in the anisotropic formation. These two anisotropy-related features propagate through the HDIL software focusing. The HDIL vertical resolution matching (VRM) curves shown in FIG. 4b clearly demonstrate this fact. FIGS. 4a and 4b also show that a co-axial induction tool tends to read the asymptotic conductivity in an anisotropic formation, which is determined by eq. (9). Vertical Resolution Matching (VRM) is a process that enhances the curves to predetermined vertical resolutions of, for example 0.5 foot, 1 foot, 2 feet, and/or 4 feet. In FIGS. 4a, 4b and also in the examples below, only the equivalent or asymptotic resistivity values are shown. If the anisotropy factor and the angle of inclination are known, then the vertical and horizontal resistivities may be recovered.

Figure 5B:
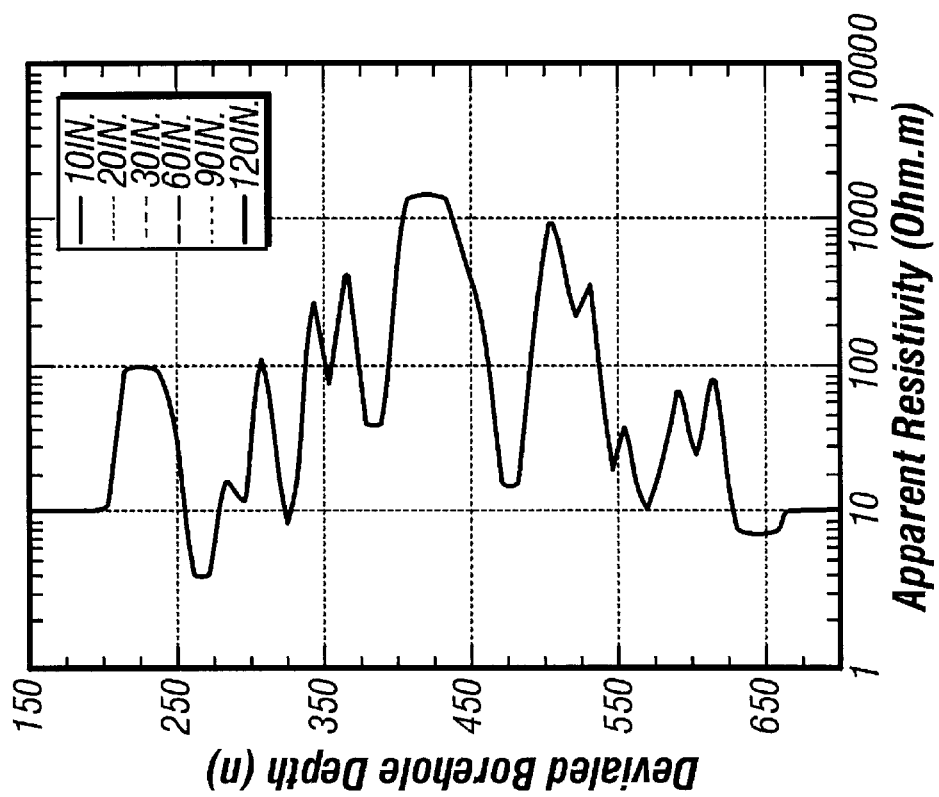
FIGS. 5a and 5b show a comparison of results obtained using prior art methods and the method of the present invention on model data.
Figure 5A:
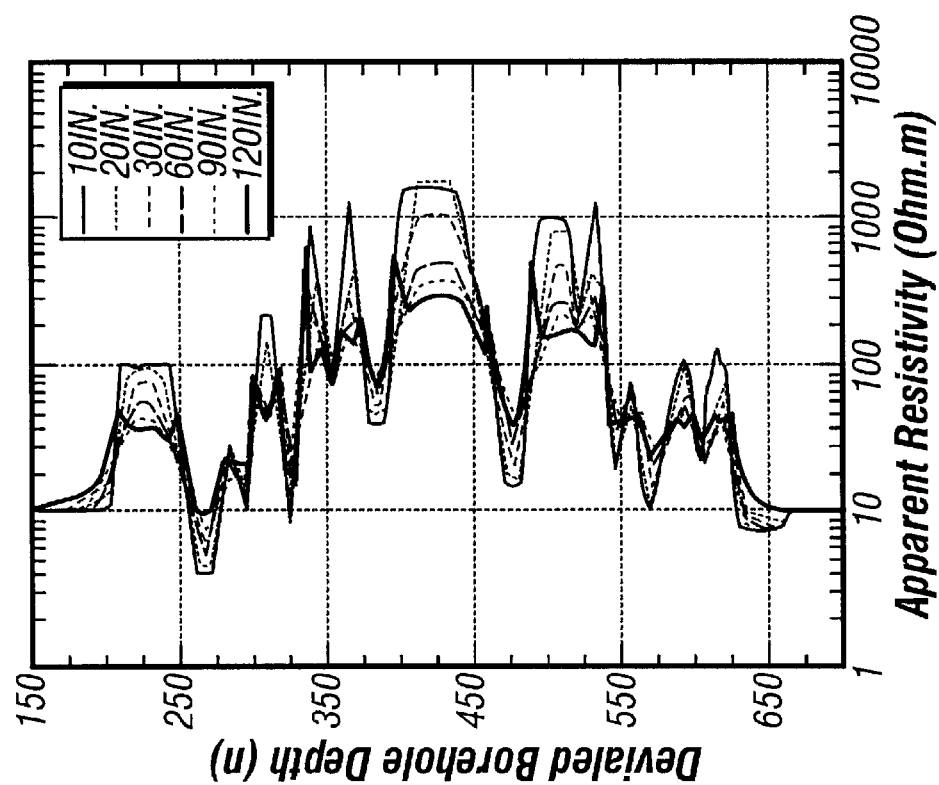

FIG. 5a shows the result of processing data from a second, layered model using the method described in the '105 application, i.e., assuming that the borehole is vertical and ignoring the effect of anisotropy. In the actual model, the borehole had a 70° inclination to the normal to the bedding plane. Again, the data for seven different source-receiver distances are displayed after VRM and clearly show that ignoring the effects of anisotropy and dip. In comparison, FIG. 5b shows the results of processing the same model output with the method of the present invention, i.e., including the effects of the deviated borehole and of anisotropy. The results in FIG. 5b are clearly superior to the prior art method.

Figure 6A:
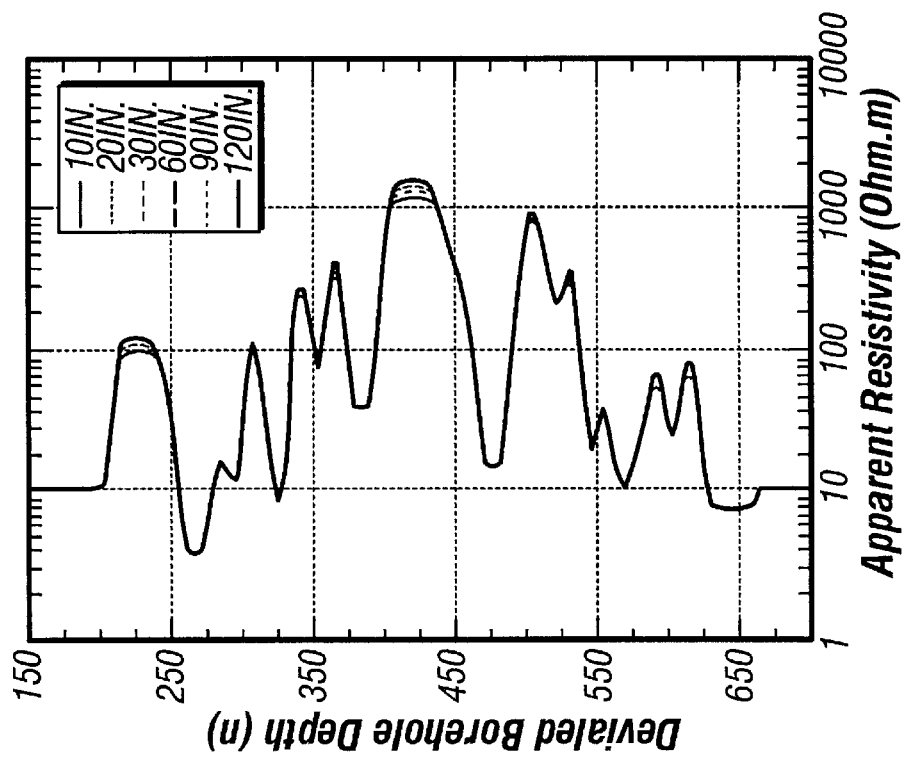
FIGS. 6a and 6b illustrate the relative insensitivity of the method of the present invention to an incorrect inclination angle used in the analysis on model data..
Figure 6B:
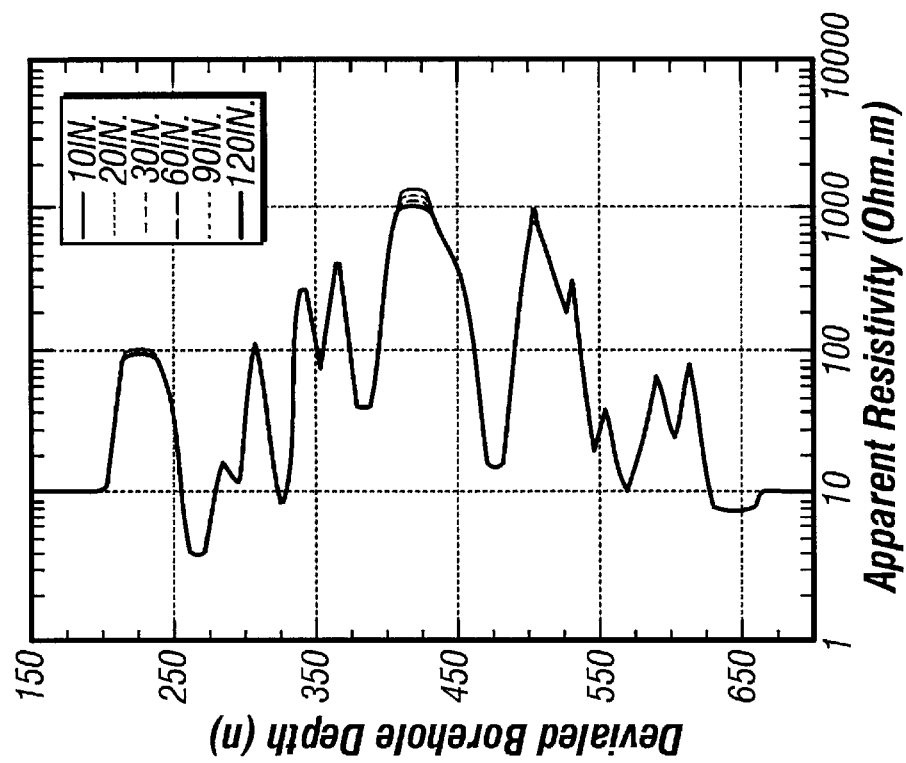

The method of the present invention is relatively insensitive to errors in the assumed inclination angle. This is shown in FIGS. 6a and 6b where the same model output for which results are shown in FIGS. 5a, 5b were processed using the method of the present invention with an incorrect assumption of the inclination angle. FIG. 6a was obtained by assuming an angle of 65° whereas FIG. 6b was obtained assuming an angle of 75°, when, as noted above, the actual angle was 70°. The method of the present invention is seen to be robust for errors in the inclination angle of 5°.

Figure 7:
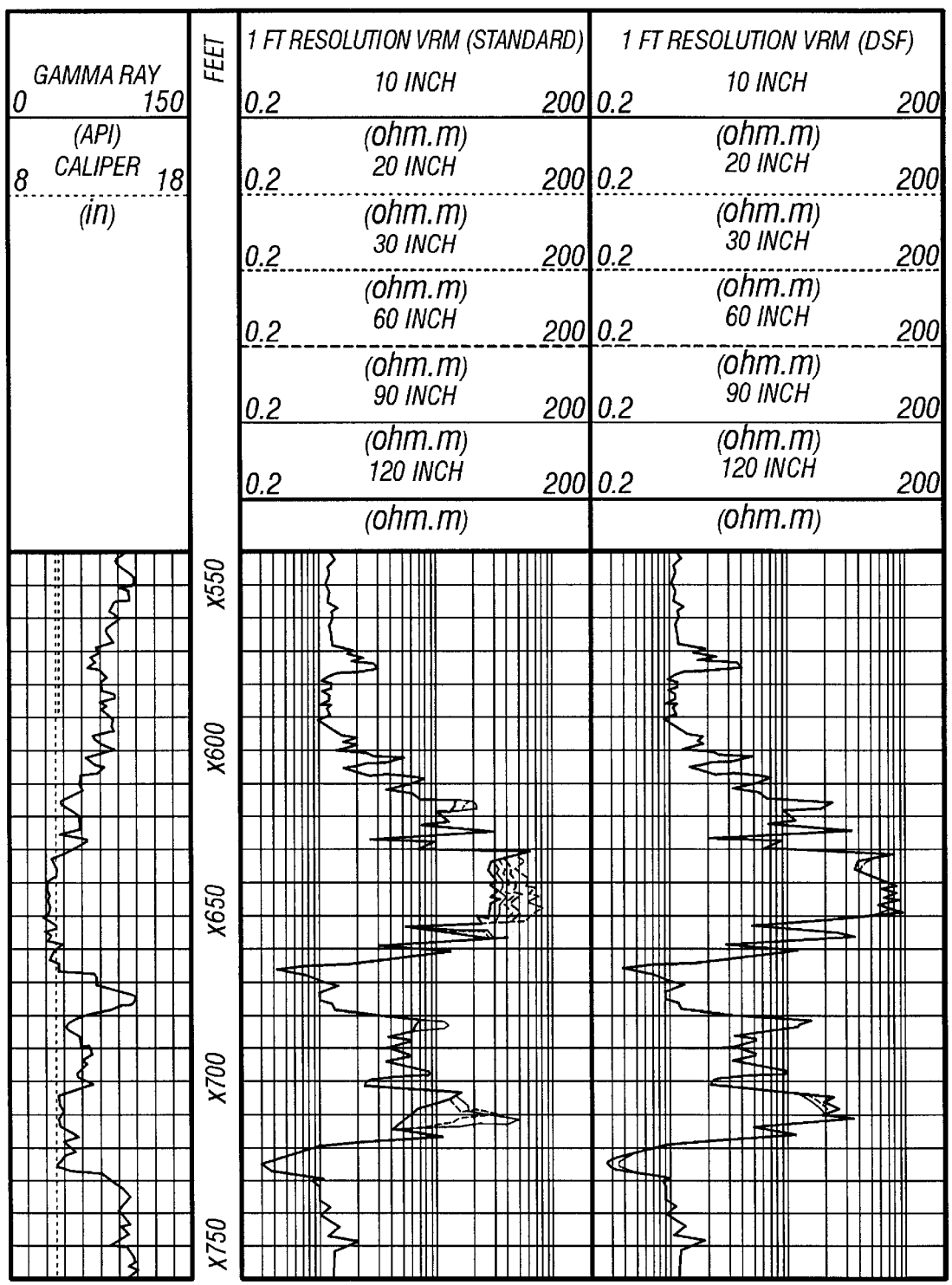
FIGS. 7 shows a comparison of results obtained using prior art methods and the method of the present invention on field measurements.

FIG. 7 shows a field example. Caliper and gamma-ray logs are presented in the left track. The HDIL 1-ft VRM curves produced with the standard focusing method are shown in the middle track. The curve separation over the pay zones (e.g., at depths 630–650) and can be easily interpreted as resistive invasion. This interpretation, however, conflicts with local experiences. With a relative dip angle of 45 degrees, the method of the present invention produced a set of more reliable curves (in the right track). The value of the dip angle was later confirmed by image tools.

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWD) assembly conveyed on a drill string or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of using an induction logging tool in a borehole within earth formations for determining conductivities thereof, the borehole axis having an inclination angle to a symmetry axis of said earth formations, the method comprising:
   (a) estimating an anisotropic background formation model from borehole corrected data, said anisotropic background model comprising horizontal and vertical resistivities;
   (b) determining asymptotic conductivities of the anisotropic background model relative to the borehole axis using an assumed value for said inclination angle;
   (c) obtaining a modeled response for said anisotropic background model with said asymptotic conductivities;
   (c) making skin-effect corrections to said modeled response giving a skin-effect corrected response;
   (d) calculating a response residual as a difference between the skin-effect corrected response and the borehole corrected data;
   (e) focusing said residual giving a focused residual;
   (f) calculating an idealized focused result for said background model; and
   (g) combining the results of said focusing of said residual with said ideal focused results.

2. The method of claim 1 wherein obtaining the asymptotic conductivity of the anisotropic background model further comprises using the relation $\sigma_e = \beta \sigma_h$ wherein $\sigma_e$ is the asymptotic conductivity, $\sigma_h$ is the horizontal conductivity, $$\beta = \frac{\sqrt{\sin^2\theta + \lambda^2 \cos^2\theta}}{\lambda^2}$$

where $\theta$ is the assumed angle of inclination and $\lambda$ is the square root of the ratio of the horizontal conductivity and vertical conductivity.

3. The method of claim 1 wherein calculating said response residual further comprises converting the skin-effect corrected response to true vertical depth.

4. The method of claim 1 wherein calculating the idealized focusing result for said background model further comprises converting the background model to true vertical depth.

5. The method of claim 1, wherein said response residual is smaller than said modeled response.

6. The method of claim 1 wherein focusing said residual further comprises using linear focusing.

7. The method of claim 2 wherein calculating said response residual further comprises converting the skin-effect corrected response to true vertical depth.

8. The method of claim 7 wherein calculating the idealized focusing result for said background model further comprises converting the background model to true vertical depth.

9. The method of claim 1 wherein the assumed angle of inclination differs from the angle of inclination by less than 5°.

10. A system for making geophysical measurements in a deviated borehole having an axis with an inclination angle to a symmetry axis of earth formations, the system comprising:
   (a) a logging tool to make geophysical measurements having at least one transmitter and at least one receiver array; and (b) a computing device programmed to
   (i) estimate an background formation model from said geophysical measurements,
   (ii) determine an asymptotic conductivity of the anisotropic background model using an assumed inclination angle,
   (iii) obtain a modeled response for said background model, giving a modeled response,
   (iii) make skin-effect corrections for said modeled response giving a skin-effect corrected response,
   (iv) calculate a response residual as a difference between the skin-effect corrected response and borehole corrected geophysical measurements,
   (v) focus said residual giving a focused residual,
   (vi) calculate an idealized focused result for said background model, and
   (vii) combine the results of said focusing of said residual with said ideal focused results.

11. The system of claim 10 wherein the computing device is further programmed to obtain said asymptotic conductivity using the relation $\sigma_e = \beta \sigma_h$ wherein $\sigma_e$ is the asymptotic conductivity, $\sigma_h$ is the horizontal conductivity, $$\beta = \sqrt{\frac{\sin^2\theta + \lambda^2\cos^2\theta}{\lambda^2}}$$

where $\theta$ is the assumed angle of inclination, and $\lambda$ is the square root of the ratio of the horizontal conductivity and vertical conductivity.

12. The system of claim 10 wherein the computing device is further programmed to convert the skin-effect corrected response to true vertical depth.

13. The system of claim 10 wherein the computing device is further programmed to convert the background model to true vertical depth.

14. The system of claim 10 wherein the assumed angle of inclination differs from the angle of inclination by less than 5°.

* * * * *